Oct. 7, 1958 — F. H. NICOLL — 2,855,531
ELECTROLUMINESCENT DEVICES AND SYSTEMS
Filed Jan. 4, 1957 — 2 Sheets-Sheet 1
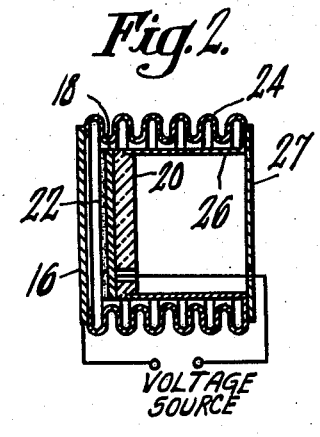
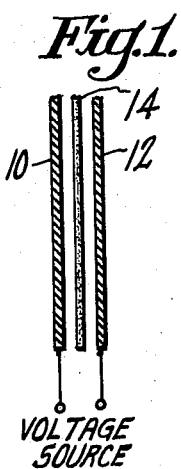
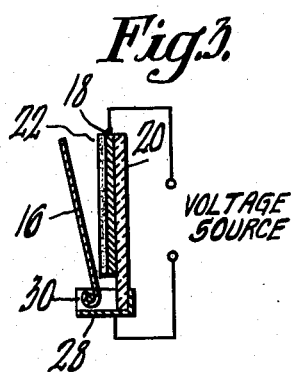
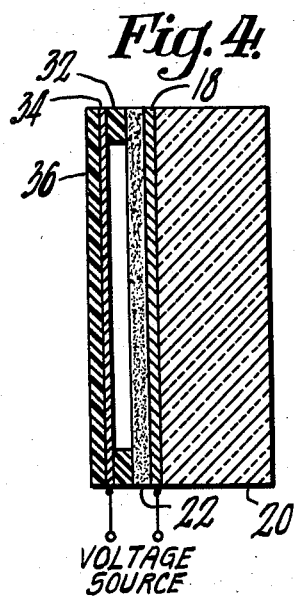
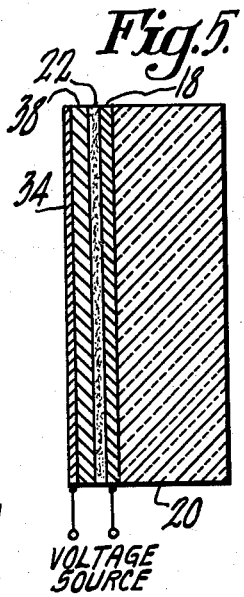
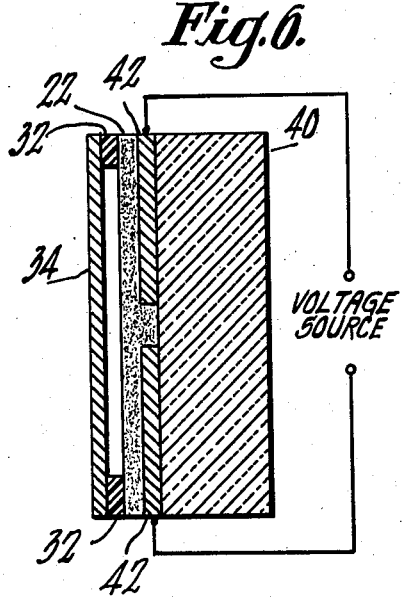
INVENTOR.
*Frederick H. Nicoll*
BY
*William A. Zabuske*
ATTORNEY INVENTOR.
Frederick H. Nicoll
BY
William A. Zalesak
ATTORNEY

United States Patent Office 2,855,531
Patented Oct. 7, 1958

2,855,531

ELECTROLUMINESCENT DEVICES AND SYSTEMS

Frederick H. Nicoll, Princeton, N. J., assignor to Radio Corporation of America, a corporation of Delaware Application January 4, 1957, Serial No. 632,492

12 Claims. (Cl. 313—108)

This invention relates to electroluminescent devices and systems.

It is known that certain of the materials known as phosphors can be caused to emit visible or near visible light by subjecting them to electric fields, different phosphors displaying different colors of luminesce. This phenomenon, known as electroluminescence, may be observed by placing a phosphor and a suitable resistance means between and in electrical contact with two electrical conductors. When a constant unidirectional electric field of sufficient magnitude is established between the conductors by the application of a potential difference or voltage thereto, a current will be caused to flow and the phosphor particles will luminesce. Such luminescence will appear to be continuous and its intensity will vary in proportion to the current flow. The resistance means functions to limit the current flow through each particle of the phosphor to a value below that at which destruction of the particles will occur and may take the form of a body of material, having a resistance through a square centimeter thereof in the neighborhood $10^8$ ohms, in contact with a body of the phosphor. A pulsating unidirectional electric field or an alternating electric field, produced by pulsating or alternating voltages respectively, will also cause luminescence, but in bursts corresponding to the maximums of current flow which they produce.

If the magnitude of the series resistance means is so high that it is effectively an insulator, for example, if the phosphors are suspended in a transparent dielectric material prior to being placed between the conductors, the current flow through the phosphor will be reduced to a negligible value and the application of a unidirectional voltage to the conductors will only induce a single burst of electroluminescence in the phosphors as an electric field or charge builds up thereacross. When the full charge has been received, thus stabilizing the electric field between the conductors, the electroluminescence will cease. However, the subsequent removal of the unidirectional voltage and discharge of the accumulated charge will induce a second burst of electroluminescence as the electric field collapses.

Similarly, if an alternating voltage is applied to the conductors, bursts of electroluminescence will occur in the phosphors corresponding to the changing electric field caused by the charge and discharge of the device produced by such alternating voltage. Thus, when the resistance means is effectively an insulator, pulsating unidirectional voltages or alternating voltages may be used to produce seemingly constant electroluminescence although a constant unidirectional voltage will produce only a single burst of electroluminescence. That is, if the frequency of the applied pulsating or alternating voltage is high enough, bursts of electroluminescence will occur at intervals shorter than the retentivity of the eye, thus making the electroluminescence appear to be continuous.

Several theories for explaining the phenomena of electroluminescence are currently in force, none of which are entirely satisfactory. However, it seems to be agreed that the applied electric field causes a redistribution of electrons in the electroluminescent phosphor and the consequent emission of light from such phosphor.

The basic electroluminescent device, heretofore known, comprises electroluminescent material (i. e. a phosphor plus a resistance or insulating material) sandwiched between two rigid conductors which are fixedly positioned with respect to each other. The principal object of the device is to serve as an area source of light since the entire operable portion of the device will luminesce substantially uniformly upon the application of voltage to the conductors. It has been found that the intensity of the electroluminescence produced will vary directly with the magnitude of the applied voltage and also, in the case of pulsating or alternating voltages, with the frequency of such applied voltage. Another phenomenon which has been observed is that, in the case of pulsating or alternating voltages, the color of the electroluminescence will vary not only with the phosphor used but also with the frequency of the applied voltage.

It is known that such a device can be made responsive to radiations through the use of a material which will exhibit a change in impedance characteristics under the influence of radiations. For example, a photoconductive material may be sandwiched between the conductors with the electroluminescent material, and a voltage applied to the sandwich. The incidence of radiations on the photoconductive material will produce a variation in its impedance characteristics and thus cause a change in the magnitude of the fraction of the total voltage or electric field which is established across the electroluminescent material. The device, so improved, is capable of reproducing and even amplifying the intensity of incident half-tone images when properly designed. Thus, electroluminescent devices of the prior art are subject to electrical control and have heretofore been rendered responsive to radiations.

It is an object of this invention to provide an electroluminescent device which is responsive to mechanical forces acting thereon.

It is a further object of this invention to provide an electroluminescent device which is responsive to pressure applied to the device.

It is another object of this invention to provide an electroluminescent device adapted to produce an electroluminescent image in response to mechanical forces acting on selected areas of the device.

It is yet another object of this invention to provide an electroluminescent device adapted to produce and retain an electroluminescent image in response to mechanical forces acting on selected areas of the device.

It is still another object of this invention to provide a device adapted to convert sonic or ultra-sonic sound energy to radiant energy.

It is a still further object of this invention to provide a device and system adapted to transduce sonic or ultra-sonic sound energy into radiant energy and the radiant energy into electrical energy.

It is yet a further object of this invention to provide a device and system adapted to produce an electroluminescent image in response to the incidence of a pattern of sonic or ultra-sonic sound energy thereon.

It is another object of this invention to provide a novel and improved electroluminescent device.

Briefly, a device according to this invention comprises electroluminescent material between two spaced conductors and means mounting such conductors with respect to each other so that they are movable with respect to each other in response to the incidence of mechanical force. A voltage applied to the conductors will establish an electric field between the conductors which will act upon the electroluminescent material. The incidence of mechanical force on one or both of the conductors will cause a displacement of the conductors with respect to each other and a consequent change in the electric field between them. Such changes in electric field in response to mechanical forces may be used to control the luminescence from the electroluminescent material upon which the electric field acts. In some embodiments of the invention, means are provided for the production and retention of electroluminescent images in response to patterns of mechanical force, and, in other embodiments, means are provided for the transduction of mechanical force into radiant energy and into electrical energy, etc., through the use of electroluminescence.

The invention will be more completely understood when the following detailed description is read in conjunction with the appended two sheets of drawing wherein:

Figure 1 is a cross-sectional view of an operative portion of a device according to this invention.

Figure 2 is a cross-sectional view of an embodiment of this invention.

Figure 3 is a cross-sectional view of another embodiment of this invention.

Figure 4 is a cross-sectional view of yet another embodiment of this invention.

Figure 5 is a cross-sectional view of a further embodiment of this invention.

Figure 6 is a cross-sectional view of a still further embodiment of this invention.

Figure 7:
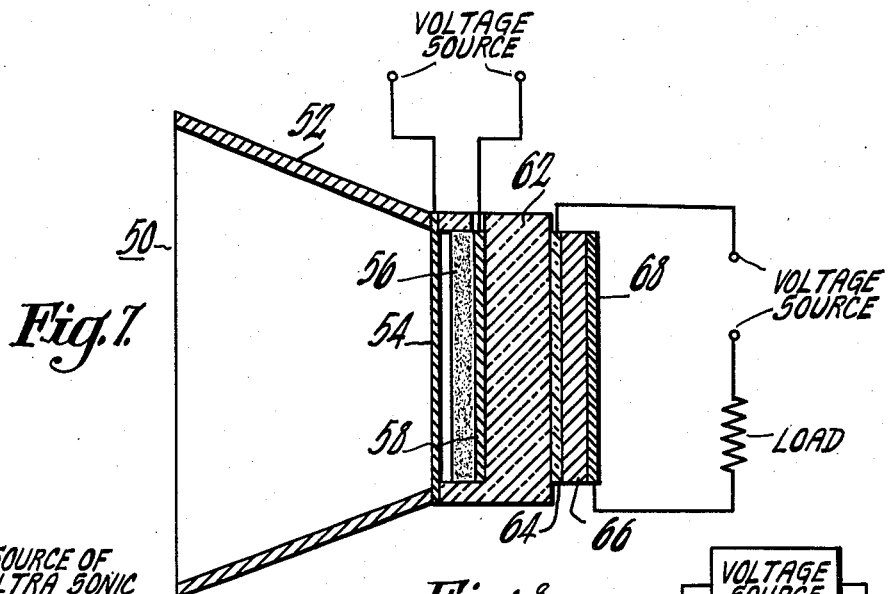
Figure 7 is a cross-sectional view of still another embodiment of this invention, adapted to act as a transducer for converting mechanical energy to radiation energy and finally to electrical energy.

Referring to Figure 1, the simplest embodiment of this invention may comprise a first electrode 10 and a second electrode 12 in the form of conductive layers, separated from each other and movable with respect to each other. A layer, stratum or body 14 of electroluminescent material having a thickness less than the space between the electrodes 10 and 12 is positioned between the electrodes 10 and 12. A voltage source is connected between the first electrode 10 and the second electrode 12. The voltage applied to the electrodes 10 and 12 will produce an electric field extending through the electroluminescent material 14. An increase in the spacing between the two electrodes 10 and 12 will decrease the intensity of the electric field therebetween and similarly a decrease in spacing will increase the intensity of the electric field. Thus, it will be seen that, given a voltage source of fixed magnitude connected between the two electrodes 10 and 12, the intensity of the electric field extending through the electroluminescent material 14 may be controlled by adjusting the spacing between the electrodes 10 and 12.

The voltage source connected between the two electrodes 10 and 12 may supply a unidirectional voltage, or an alternating voltage, of sufficient magnitude to cause electroluminescence when the electrodes 10 and 12 are spaced by a given distance. In the case of constant unidirectional applied voltage no electroluminescence will be produced, except for an initial burst when the voltage is applied, so long as the spacing between the electrodes 10 and 12 is not changed. However, a burst of electroluminscence will be produced by each change in such spacing. The intensity of the burst of electroluminescence produced by a given change in spacing will be dependent upon both the magnitude of the change and the frequency or speed of such change. Apparently constant electroluminescence may be produced by vibrating one or both of the conductors with respect to each other at a sufficiently high frequency.

In the case of alternating applied voltage a constant electroluminescence will be produced, the intensity of which will be increased if the conductors are brought closer together or decreased if the conductors are moved further apart. Vibration of one or both of the conductors will cause fluctuation of the electric field intensity which will become intermixed with the fluctuations in field intensity resulting from the applied alternating voltage and may result in a change in intensity or color of the resulting electroluminescence.

If a pulsating unidirectional voltage is applied, the operation of the device will be similar to that with constant unidirectional voltage applied, since the first pulse of unidirectional voltage will establish a charge on the device which will not be discharged between pulses. The device will thus be charged to a relatively constant voltage at all times unless a discharge means is provided. If a discharge means is provided, such as a suitable resistance in parallel with the device, the operation will be substantially the same as with alternating voltage applied.

The electrodes 10 and 12 may be either rigid or flexible. If the electrodes 10 and 12 are rigid, then their motion with respect to each other must be a bodily motion (i. e. the conductors 10 and 12 move toward or away from each other in their entirety). If at least one of the electrodes 10 and 12 is flexible, the electrodes may be mounted in fixed relation to each other and the flexibility of such electrode or electrodes may be relied upon to enable relative motion between portions of the electrodes. In devices involving the visual observation of the electroluminescence produced, it is preferable that at least one of the electrodes (e. g. 12) be transparent.

Referring to Figure 2, a specific embodiment of this invention is shown which comprises a pair of rigid electrodes 16 and 18 movably mounted with respect to each other and on opposite sides of an electroluminescent body. The first electrode 16 may comprise a metal plate, for example. The second electrode 18 may comprise a transparent conductive coating on one surface of a sheet of glass 20 which coating may be applied by the deposition of the vapors of stannic acid, water, and methanol on the glass. The electroluminescent body may comprise a phosphor bonded together by a suitable matrix (e. g. zinc sulfide particles suspended in ethyl cellulose) and applied to the electrode 18 on the sheet of glass 20 in the form of a layer 22 by silk screening or other suitable processes. The electrodes 16 and 18 are movably mounted with respect to each other by means of a resilient member 24 adapted to allow axial compression thereof. The resilient member 24 may be in the form of a bellows with transverse corrugations, for example, and may be made of a resilient metal. The first electrode 16 may be mounted in one end of the resilient tubular member 24 closing such end. The second electrode 18 and the electroluminscent layer 22 may be mounted within the resilient tubular member 24 and adjacent the first electrode 16 by means of a support tube 26. The sheet of glass 20 upon which the second electrode 18 is supported is mounted in one end of the support tube 26. The support tube 26 is then inserted into the resilient tube 24 and a flange 27, on the opposite end of the support tube 26 from the second electrode 18, is attached to the opposite end of the resilient tube 24 from the first electrode 16. Thus, any pressure differential on the two electrodes 16 and 18 will change the spacing therebetween by compressing or expanding the corrugations in the resilient member 24.

The voltage source connected between the two electrodes 16 and 18 may supply a constant unidirectional, a pulsating unidirectional or an alternating voltage and the device will operate substantially as described hereinabove to produce electroluminescence. It will be seen that the movement of the electrodes 16 and 18 with respect to each other will be a bodily movement, since both electrodes are rigid, and will occur primarily symmetrically along the axis of the device due to the symmetric mounting of the electrodes to each other. Thus, in the absence of the non-symmetric application of forces to the device, electroluminescence will be produced substantially uniformly across the entire surface thereof.

Referring to Figure 3, an embodiment of this invention is shown which is substantially identical to that shown in Figure 2 with exception of the fact that the electrodes are pivotally mounted to each other by a hinge means. The first electrode 16 comprises a metal plate and the second electrode 18 comprises a conductive coating on a sheet 20 of glass. The electroluminescent layer 22 is applied to the second electrode 18. The electrodes 16 and 18 are mounted relative to each other by means of a metallic support 28 extending along one edge thereof, the first electrode 16 being attached to the support 28 by means of a pivot or hinge 30 and the glass sheet 20 being rigidly attached to the support 28. A voltage source as described hereinabove is connected between the two electrodes 16 and 18.

It will be seen that the movement of the two electrodes with respect to each other in response to mechanical forces will be a bodily movement resulting in an angular displacement of the electrodes from each other due to the action of the pivot 30. Thus, it is possible to produce electroluminescence which will vary in intensity across the surface of the device depending on the angle which the two electrodes 16 and 18 form with each other.

The embodiments shown in Figures 2 and 3 represent the two types of operative motion which may be utilized by embodiments of this invention in which the electrodes are rigid. However, other embodiments of this invention may comprise one or more flexible electrodes.

Referring to Figure 4, a device embodying this invention may comprise an electrode 18 in the form of a transparent conductive coating on one surface of a sheet of glass 20, a layer 22 of electroluminescent material on such conductive coating 18, an insulating spacer means 32 extending along edges of the layer 22 of electroluminescent material, and a flexible conductor or electrode 34 bridging across such insulating spacer means 32 and being thereby spaced from the layer 22 of electroluminescent material. The transparent conductive coating 18 and the layer 22 of electroluminescent material may be provided as described hereinabove. The insulating spacer means 32 may comprise an annular disc of an insulating material such as a one mil thick mica disc, for example, and the flexible electrode 34 may comprise a metal foil (e. g. of aluminum, one mil thick) preferably reinforced by an insulating backing layer 36 (e. g. of cellophane).

In operation, a voltage (e. g. several hundred volts) is applied between the transparent conductive coating 18 and the metal foil 34. Due to the flexibility of the insulating backing layer 36 and the metal foil 34, pressure applied thereto (for example, by tapping on such backing layer 36 or directing an air stream thereon) will produce a flexure or curvature thereof, thus bringing a portion of the metal foil 34 closer to the transparent conductive coating 18. The electric field produced between the metal foil 34 and the transparent conductive coating 18 by the voltage applied thereto will be altered by such flexure, the maximum field occurring at the point of closest proximity of the metal foil 34 to the transparent conductive coating 18 and the maximum intensity of electroluminescence will occur in the layer 22 of electroluminescent material at the point of maximum field intensity.

Either unidirectional or alternating voltage could be used with the device shown in Figure 2 depending upon the application for which the device is to be used. For example, if it is desired to use the device to indicate the presence or magnitude of a constant pressure upon the flexible conductor 34 an alternating voltage would be applied which would cause the device to emit fairly constant luminescence the intensity and area of which would vary in proportion to the magnitude of the mechanical force exerted on the flexible electrode 34. But if it is desired to use the device to indicate the incidence of mechanical force of vibratory nature upon the flexible electrode it might prove more desirable to use unidirectional voltage since the intensity of the luminescence would then vary with both the amplitude and frequency of the incident vibratory force. In addition the color of the luminescence would vary with the frequency of the incident vibratory force.

Referring to Figure 5, a device according to another embodiment of this invention is shown. As was described above with respect to other embodiments, one electrode 18 may comprise a transparent conductive coating as a sheet of glass 20 and a layer 22 of electroluminescent material may be supported on such conductive coating 18. According to this embodiment, an easily deformable adhesive insulating layer 38 (e. g. of wax or soft resin) is placed over the electroluminescent layer 22 and the flexible electrode 34 in the form of a sheet of metal foil is placed on the adhesive layer 38. As described above, a voltage source may be connected between the transparent conductive coating 18 and the metal foil 34.

According to the preferred mode of operation, an alternating voltage is applied between the transparent conductive coating 18 and the metal foil 34, the magnitude of which is slightly below that necessary to induce luminescence in the electroluminescent layer 22. In order to produce electroluminescence, pressure must be applied to the metal foil 34. Preferably, such pressure is applied at a point, line, or small area on the surface of the metal foil 34 to force the metal foil against the adhesive layer 38, producing indentations in such adhesive layer 38. As described above, when the metal foil 34 is brought into closer proximity to the conductive coating 18, the electric field therebetween will be increased resulting in localized luminescence in the electroluminescent layer corresponding to the point, line, or small area over which pressure was applied to the metal foil 34. Thus, it is possible to produce electroluminescent images by drawing or writing on the metal foil with a suitable stylus or similar instrument (not shown) to produce the necessary displacement of the metal foil 34.

An additional feature of this embodiment is that the image will remain after the pressure is removed. Due to the adhesion of the layer 38 to the metal foil 34, the metal foil 34 will be retained in the indentations produced by the stylus. Thus, the electroluminescence will continue to occur until the voltage source is disconnected or the metal foil 34 is forceably removed from the indentations in the layer 38.

Alternatively, the adhesive layer 38 in Figure 5 might be composed of a spongy or resilient material such as rubber which is selected for its ability to recover from indentation in a certain desired time interval or even immediately.

Referring to Figure 6, a device according to yet another embodiment of this invention is shown. This device comprises a sheet of glass 40 upon one major surface of which two spaced electrodes 42 may be deposited according to the method described above, with the addition of a masking means to provide proper spacing between the electrodes 42. A layer 22 of electroluminescent material extends over and intervenes between the electrodes 42. A flexible sheet conductor 34 is mounted in spaced relation to the electroluminescent layer 22 by means of insulating mounts 32 and extends over the space between the electrodes 42. A voltage source is connected between the spaced electrodes 42 on the glass sheet 40. Alternatively, the conductor 34 may be rigid and movably mounted with respect to the spaced electrodes 42 as described with reference to Figures 2 and 3.

An applied voltage will produce an electric field between the spaced electrodes 42 which may be varied by bringing all or a portion of the conductor 34 into closer proximity to the spaced electrodes 42, and thus tending to bridge the spacing between such electrodes 42. In effect, the conductor 34 will provide a low impedance path for the electric field thus producing an intensification of the field at the points where the conductor 34 overlaps the spaced electrodes 42. Either unidirectional or alternating voltage may be applied and the device will operate in a manner similar to that described hereinabove with respect to other embodiments.

The electrodes 42 supported on the sheet of glass 40, according to this embodiment, may be in the form of straight conductors having parallel sides or in the form of interdigital fingers or interleaved spirals. Thus, the displacement of the conductor 34 will result in an electroluminescent design, the form of which will be determined in part by the form of the spaced electrodes 42 and in part by the type of movement of the conductor 34 and the form and method of application of pressure to the sheet conductor 34.

It will be seen that other devices embodying this invention may be produced through combinations of the devices shown in the drawing and hereinabove described. Furthermore, although the electroluminescent material has been thus far described as a phosphor suspended in a transparent insulating dielectric, it would be possible to use a layer of dry phosphor since the spacing between the conductors will prevent unidirectional current flow which might result in breakdown of the phosphor particles.

The devices may also be adapted to produce electroluminescence in response to unidirectional current flow as distinguished from electroluminescence produced in response to fluctuating fields. For example, the electroluminescent material may comprise a layer of phosphor particles bound together by a suitable matrix and a layer of resistive material in contact therewith. Such electroluminescent material would exhibit seemingly constant luminescence in response to direct-current flow. However, certain changes in the structures shown would be necessary in order to enable such direct current flow.

For example, according to the embodiments shown in Figures 2, 3, 4 and 6, the electrodes would have to be brought into direct contact with the electroluminescent material in order to produce luminescence. In the embodiment shown in Figure 5, the adhesive layer 38 may comprise a high resistance material in direct contact with the layer of electroluminescent material 22, in which case direct current would flow in proportion to the resistance between the conductive coating 18 and the metal foil 34, which resistance would be determined in part by the depth of the indentations made in such resistive layer by the application of pressure to the metal foil as described above.

Devices embodying this invention may be used to indicate the presence or absence of pressure as by incorporating them directly into in a wall of a pressure-tight vessel. They may also be used for the production of luminescent images in response to the application of pressure in a manner similar to writing or drawing with a stylus or pencil. In addition, they may be adapted to indicate acceleration or deceleration by mounting the conductors so as to be displaced in response to the inertia thereof.

Devices embodying this invention are particularly useful where the mechanical force applied is a periodically recurring force such as sonic or ultrasonic vibration. Referring to Figures 2, 3, 4, and 6, it will be seen that the incidence of mechanical force in the form of periodic vibration will produce periodic motion of the electrodes with respect to each other and thus periodic fluctuations in the electric field acting on the electroluminescent material. Thus, constant unidirectional as well as pulsating unidirectional and alternating voltages may be used to produce seemingly constant luminescence without altering the device shown.

Referring to Figure 7, a device is shown which makes use of this feature of the invention. A microphone 50 comprising a funnel shaped member 52 closed at the small end by a thin metallic diaphragm member 54 is mounted in close spaced relation to an electroluminescent layer 56 deposited upon a rigid transparent electrode 58 (e. g. a transparent conductive coating on a sheet of glass 62). A voltage source is connected between the thin metallic member 54 and the rigid transparent electrode 58. The incidence of periodic mechanical force such as sound waves upon the metallic member 54 will cause it to vibrate thus changing the spacing of the member 54 from the electroluminescent layer 56 and rigid electrode 58. Such change in spacing will result in a change in the electric field acting upon the electroluminescent material which in turn will result in the luminescence of electroluminescent material. Thus, it will be seen that luminescence may be produced by speaking or otherwise introducing sonic or ultra-sonic vibrations into the device.

The device may be adapted to convert sound waves to electric energy by the addition of a photoconductive cell to the device, positioned so that the luminescence from the electroluminescent material will impinge upon the photoconductive cell. For example, a second transparent electrode 64 may be applied to the opposite surface of the sheet of glass 62 and a photoconductive material such as cadmium sulfide may be deposited upon the second transparent electrode 64 in the form of a layer 66. A third electrode 68 may be deposited on the free surface of the photoconductive layer 66. Such third electrode 68 may comprise a thin coating of silver paste, for example. Another voltage source may be connected between the second transparent electrode 64 and a load such as a speaker of a suitable type, for example. The load, in turn, may be connected to the third or silver paste electrode 68. Thus, sonic vibrations entering the funnel-shaped member and impinging upon the metallic member 54 will produce luminescence which will pass through the transparent insulator 62 and transparent conductors 58 and 64 thereon and impinge upon the photoconductive layer 66. The impedance of the photoconductive material will vary in accordance with the luminescence impinging thereon and will thus vary the energization of the speaker or load. Thus, sounds may be reproduced and even amplified by the device.

Figure 8:
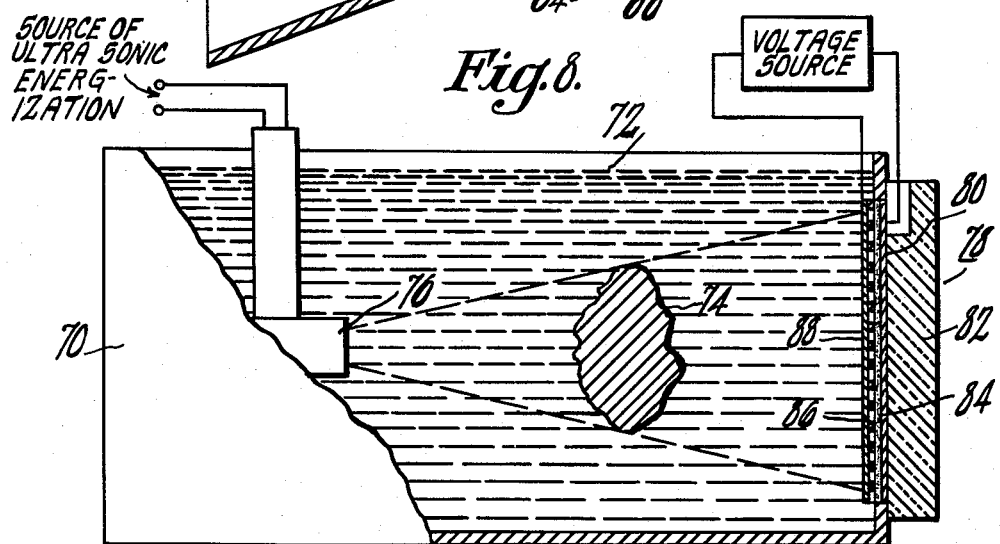
Figure 8 is a view, partially in cross-section of an ultra-sonoscopic system embodying this invention.
Figure 10:
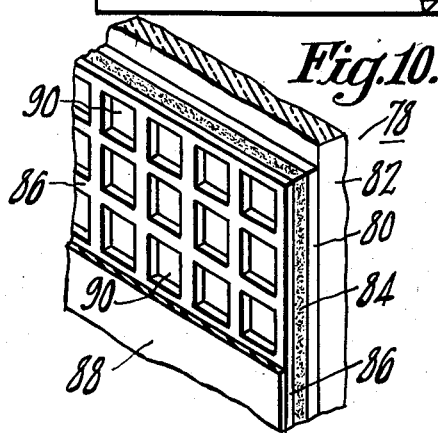
Figure 10 is a perspective view of a portion of the system shown in Figure 8.
Figure 9:
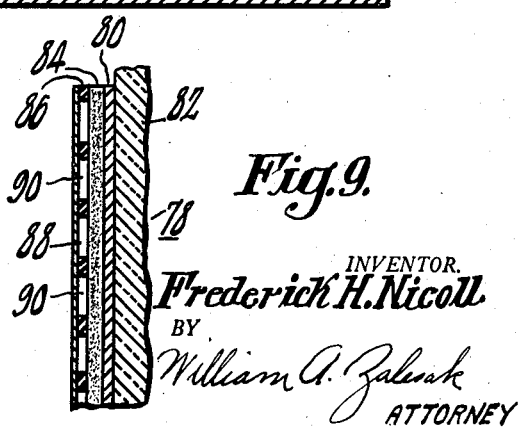
Figure 9 is an enlarged cross-sectional view of a portion of the system shown in Figure 8

Perhaps an even more significant application of devices according to this invention is shown in Figures 8, 9, and 10, which depict a system whereby an ultrasonicscope may be produced. It is known that a beam of ultrasonic energy may be passed through a body to produce an ultrasonic image thereof similar to an X-ray image. That is, the ultrasonic image will be attenuated more by certain materials of which the body is composed than by other of such materials. Thus, a uniform beam of ultrasonic energy striking a body will pass through the body and emerge as an ultrasonic image of the body. According to this invention, a device is mounted to receive such ultrasonic image and convert it to a luminescent image which may be visible for direct viewing or either visible or invisible for photographic applications.

Referring to Figure 8, it will be seen that such a system may comprise a tank 70 containing a fluid medium 72 such as water, for example. A body 74 to be examined is immersed in such liquid medium in operative relation to an ultrasonic transducer 76 also immersed in the medium. According to this invention, one end of the tank is formed by a device 78 capable of responding to ultrasonic energization to produce a luminescent image. The body 74 to be examined is positioned between the ultrasonic transducer 76 and the luminescent device 78. Thus, the ultrasonic transducer 76 produces a beam of ultrasonic energy which is directed at the body 74 to be examined and passes therethrough impinging on the luminescent device 78 where it is converted into a luminescent image.

Referring to Figures 9 and 10, the luminescent device 78 may comprise a transparent conductor 80 (e. g. a transparent conductive coating on a sheet of glass 82, as described hereinabove) and a layer 84 of electroluminescent material placed on such transparent conductor. An insulating support member which may comprise a foraminous or latticework structure 86 is positioned on such electroluminescent layer 84. The latticework structure 86 may be made of a plastic for example. A thin flat resilient conductive member 88 (e. g. metal foil) is placed over such latticework structure 86. Thus, a plurality of elemental areas are defined by apertures 90 of the latticework structure 86 and are covered by the flexible or resilient conductive member 88. A voltage source is connected between the flexible conductor 88 and the transparent conductor 80 thus establishing an electric field through the electroluminescent layer 84. The impingement of ultrasonic energy upon the flexible conductor 88 will cause the portion thereof over the apertures 90 in the latticework structure 86 to vibrate, thus changing the electric field through the associated elemental areas of the electroluminescent layer 84. It will be seen that elemental areas of electroluminescence will be produced each of which will vary in intensity depending on the intensity of ultrasonic vibration incident thereon thus making possible the production of a luminescent image in response to the incidence of an ultrasonic image.

The device 78 shown in Figures 8, 9, and 10 may be constructed as described hereinabove. For example, the electroluminescent layer 84 may comprise zinc sulfide suspended in ethyl cellulose, the foraminous or latticework member 86 may comprise a Lucite plate having a plurality of regularly and closely spaced square apertures 90 therethrough, and the flexible conductor 88 may comprise a very thin or foil-like metallic member.

Those skilled in the art will undoubtedly find many other new and useful applications for the novel electroluminescent device herein described and claimed in appended claims.

What is claimed is:

1. An electroluminescent device comprising two spaced conductors, means mounting said conductors in spaced relation in said device, and electroluminescent material located between said conductors, at least part of one of said conductors being movable with respect to the other conductor to change the spacing therebetween.

2. An electroluminescent device comprising a first conductive layer, a second conductive layer, means for mounting said second layer in spaced relation to said first layer, and a stratum of electroluminescent material between said layers, at least part of one of said layers being movable toward and away from the other.

3. An electroluminescent device comprising a stratum of electroluminescent material, a first conductive layer next to one side of said stratum, and another conductive layer next to the opposite side of said stratum, said layers being mutually mounted, at least a portion of one of said layers being movable toward and away from the other of said layers.

4. An electroluminescent device comprising a first layer electrode, a layer of electroluminescent material on said first electrode and a second layer electrode mounted in spaced relation to said layer of electroluminescent material, said second electrode being flexible with portions movable toward and away from said layer, and at least one of said electrodes being transparent.

5. An electroluminescent device comprising a first layer electrode, a layer of electroluminescent material on said first electrode, a layer of insulating, easily deformable material on said layer of electroluminescent material and a second layer electrode on said layer of easily deformable material, said second electrode being flexible and at least one of said electrodes being transparent.

6. A device as in claim 5 wherein said easily deformable material has adhesive properties.

7. An electroluminescent device comprising an insulating base member, a plurality of electrodes in spaced relation on said base member, a layer of electroluminescent material overlying said plurality of electrodes and a conductive layer in spaced relation to said electroluminescent layer, said conductive layer having portions movable toward and away from said electroluminescent layer and said electrodes.

8. An electroluminescent device comprising a first layer electrode, a layer of electroluminescent material on said electrode, a second layer electrode spaced from said electroluminescent layer, and a resilient member mounting said electrode layers for movement toward and away from each other.

9. A device as in claim 8 wherein said resilient member comprises a tubular bellows.

10. An electroluminescent device comprising two spaced conductors, means mounting said conductors in spaced relation in said device, an electroluminescent material located between said conductors, said mounting means including pivot means mounting one of said electrodes for pivotal movement relative to the other electrode to change the spacing therebetween.

11. An electroluminescent device comprising a first conductive layer, an electroluminescent layer on said conductive layer, a foraminous insulating member on said electroluminescent layer, and a flexible metallic layer on said insulating member.

12. An electroluminescent device for converting ultrasonic energy patterns into light patterns comprising a rigid plate of transparent material, a transparent conductive coating on a surface of said plate, a layer of electroluminescent phosphor on said coating, a rigid foraminous insulating plate on said phosphor layer, and a sheet of metal foil on said foraminous plate, the portions of metal foil registered with the openings of said foraminous plate forming independent diaphragms which are vibratile upon impingement of ultrasonic energy.

No references cited.